(12) United States Patent
Alarcon-Lopez

(10) Patent No.: US 7,128,493 B2
(45) Date of Patent: Oct. 31, 2006

(54) FURNITURE ASSEMBLY DEVICE

(76) Inventor: Maria Alarcon-Lopez, Nuevo de Picana, 19-3-6, Valencia (ES) E-46014

( * ) Notice: Subject to any disclaimer, the term of this patent is extended or adjusted under 35 U.S.C. 154(b) by 0 days.

(21) Appl. No.: 10/519,462

(22) PCT Filed: Nov. 20, 2002

(86) PCT No.: PCT/ES02/00545

§ 371 (c)(1),
(2), (4) Date: Dec. 29, 2004

(87) PCT Pub. No.: WO2004/005729

PCT Pub. Date: Jan. 15, 2004

(65) Prior Publication Data
US 2005/0226684 A1    Oct. 13, 2005

(30) Foreign Application Priority Data
Jul. 3, 2002   (ES) .................... 200201611

(51) Int. Cl.
F16B 21/00    (2006.01)

(52) U.S. Cl. .................... 403/322.1; 403/DIG. 12; 403/DIG. 13; 403/315; 403/319; 403/321; 403/325; 403/408.1

(58) Field of Classification Search ............ 403/321, 403/322.1, 326, 327, 318, 319, 353, 363, 403/374.1, 374.2, 374.3, 408.1, 315, 231; 312/263, 111, 140, 265.5
See application file for complete search history.

(56) References Cited

U.S. PATENT DOCUMENTS

| 2,994,888 | A | | 8/1961 | Minuti |
| 4,317,416 | A | | 3/1982 | Baum et al. |
| 5,758,988 | A | * | 6/1998 | Theodorou .................. 403/331 |
| 5,934,204 | A | | 8/1999 | Oberle |
| 6,250,842 | B1 | * | 6/2001 | Kruger ....................... 403/315 |

FOREIGN PATENT DOCUMENTS

| EP | 0783852 A1 | | 7/1997 |
| GB | 1176175 | * | 12/1965 |
| GB | 1176175 A | | 1/1970 |

* cited by examiner

Primary Examiner—James R. Brittain
Assistant Examiner—Daniel J. Mills
(74) Attorney, Agent, or Firm—Jacobson Holman PLLC

(57) ABSTRACT

A device includes a box with holes in its wings to fit setscrews and holes to insert pivots fixed to part of a piece of furniture to be attached with a handle mounted on an inside of the box that slides lengthways. This handle has holes, mounting holes and oval holes to insert the setscrews and lower wedges to drive heads of the pivots bringing two parts of the furniture to be assembled together and securing them and a spring to move the handle on the inside of the box and a lid to close the box.

9 Claims, 3 Drawing Sheets

FURNITURE ASSEMBLY DEVICE

This is a nationalization of PCT/ES02/00545 filed Nov. 20, 2002 and published in Spanish.

FIELD OF THE INVENTION

The invention is a device used to assembly furniture for use when joining or assembling all kinds of furniture and allowing for subsequent dismantling.

INVENTION BACKGROUND

A problem posed by the furniture is that its volume makes moving difficult. Furniture that can be dismantled is used to make transporting easier. Despite decreasing the size of the piece of furniture by dividing it into several parts, this resource does require certain parts to ensure easy, correct assembly.

There are currently many different devices available to assemble a piece of furniture from its individual components. These include a wide range of screws, handles and many other, sometimes complicated parts.

The problem that currently exists, however, involves finding a furniture assembly device that is really versatile, i.e. that allow for assembly and subsequent dismantling of the furniture without any of the items or parts involved in the process becoming damaged or in a state of irreversibility that hinders their later correct working order.

SUMMARY OF THE INVENTION

To solve the problems indicated, the furniture assembly device invented has been designed, which provides certain constructive singularities aimed at making furniture assembly and dismantling easier and ensuring correct assembly without damaging any item.

According to the invention, the furniture assembly device is made up of a "U"-shaped prismatic box with holes in its wings for setscrews, enabling it to be mounted in one of the pieces of furniture to be assembled, and other holes to insert the rear ends of pivots secured to the other piece of furniture to be attached.

According to the invention, the device also includes a handle mounted inside the box to move it lengthways between the inoperative position and the using position. This handle has holes in it to insert the heads of the aforementioned pivots, oval mounting holes for inserting the setscrews and lower wedges to push on the base of the pivot heads as the handle is moved to the using position, causing traction that leads to the bringing together and securing of the two pieces of furniture to be assembled.

Also according to the invention, the device includes means to move the handle inside the box and a lid to close the box.

It must be noted that all of the holes on the box wings are facing each other in a corresponding manner on both wings to make the box reversible.

The lid to close the box has a "U"-shaped construction to close by positioning its wings, closing the ends of the box and its centre and closing the entire lengthways side of the box between the free ends of the box wings.

The device includes additional closing means to secure the lid on the box in a stable manner. This point is important insofar as it is necessary to ensure nothing prevents the handle from sliding inside the box.

The additional closing means included in the box consists of tabs that finish one of the ends of both wings and an end piece that closes the opening between the wings and the centre of the box close to the other end of the wings.

In turn, the additional closing means included in the lid consist of fittings in one wing to set the aforementioned box tabs in their closing position and a threaded hole in the other wing of the lid to secure a setscrew to the lid by pressing its end down on the end piece on the box.

The handle moving means on the inside of the box consist of a threaded hole at one end of the handle so that it can move lengthways by means of the thread of a slide screw from the outside through a circular hole made in the wing of the lid.

It is worth noting that the device includes a return spring mounted on the slide screw between the end of the handle and the wing of the lid to force the handle to slide lengthways in the opposite direction to that for tightening the screw. In other words, the return spring always places the handle in an inoperative position.

To guide the handle while it is moving inside the box closed with the lid, the handle has projecting wings to finish off both sides of its upper surface so that they slide along the inside of windows distributed lengthways on one side along the lid centre and on the other side along the box centre.

The threaded hole at the end of the handle has a long thread so that the slide screw can be secured tightly.

Finally, the box with the handle and the lid is secured to the corresponding piece of furniture using setscrews that pass through the holes in front of each other on both wings of the box and the oval holes on the handle. The fact that these holes are oval means that the screws are secured tightly to the box yet do not prevent the handle from moving on the inside of the box.

One of the main features of the furniture assembly device is that it is completely hidden once installed and cannot be seen from the outside.

The materials used to make it are non-pollutants and do not damage the environment, as they are all recyclable.

BRIEF DESCRIPTION OF THE FIGURES.

To complete this description and to make for an easier understanding of the features of the invention, a set of diagrams accompany this descriptive report that, for informative and non-limitative purposes, represent the following.

DETAILED DESCRIPTION OF THE PREFERRED EMBODIMENTS

Figure 1:
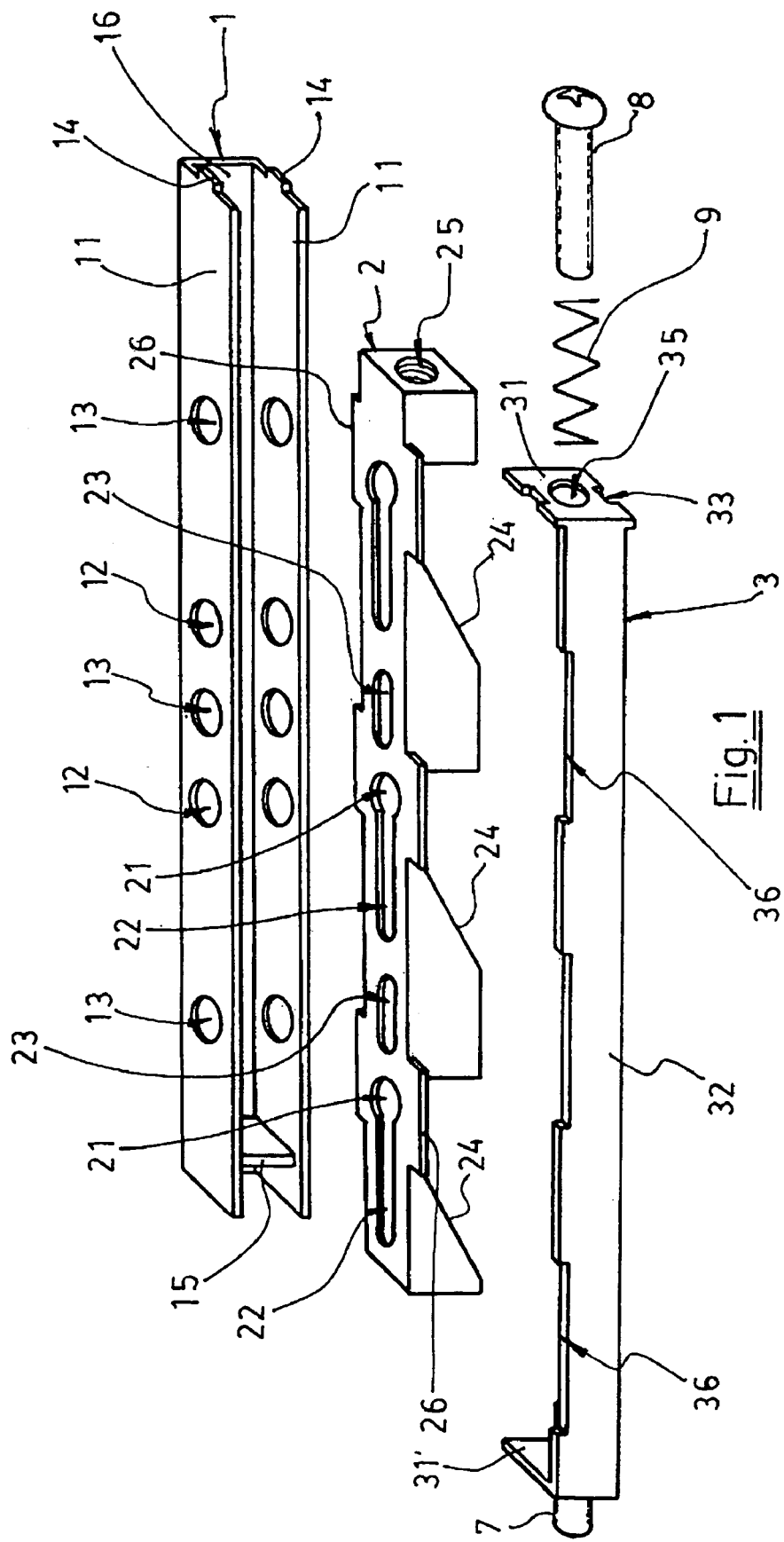
FIG. 1 shows a perspective exploded view of the furniture assembly.

As can be seen in FIG. 1, the furniture assembly device is made up of a box (1), a handle (2) and a lid (3) to close the box (1).

Figure 2:
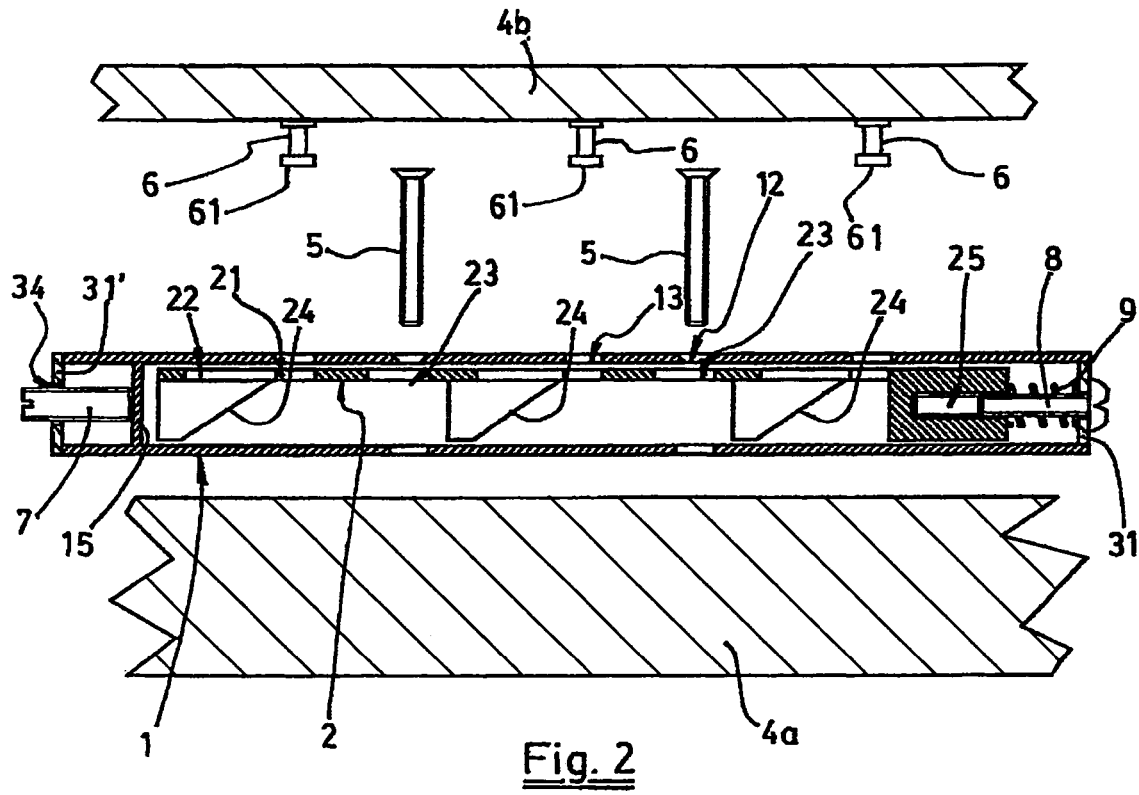
FIG. 2 shows a partially sectioned side view of the assembled device located between the parts of a piece of furniture before assembly.
Figure 3:
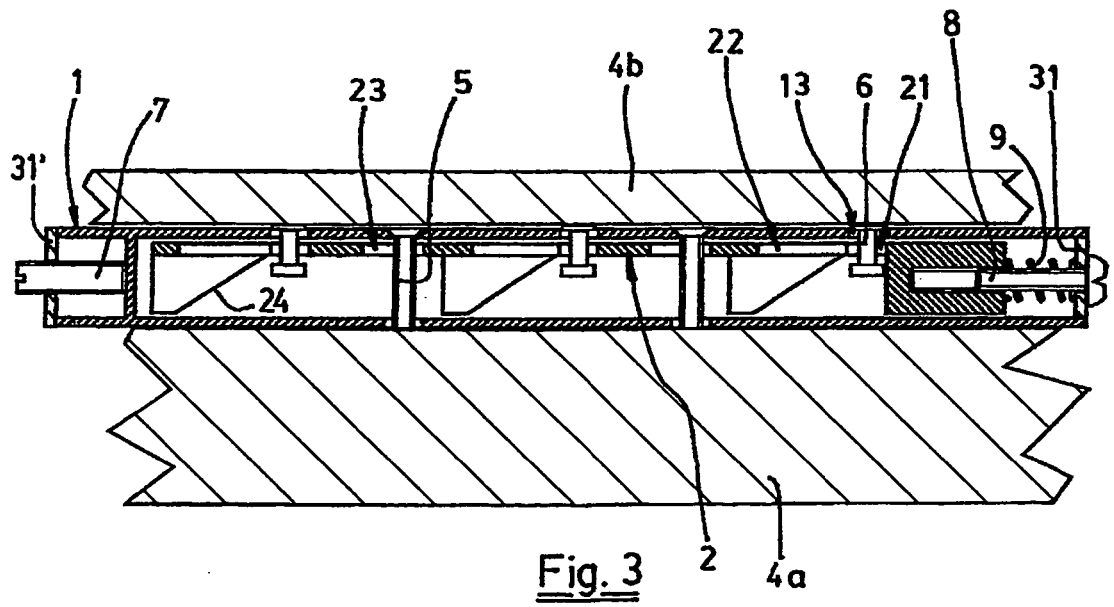
FIG. 3 shows a partially sectioned side view of the assembled device secured to one of the parts of the piece of furniture and with the other part of the furniture to be assembled located in the corresponding position but without being attached.
Figure 4:
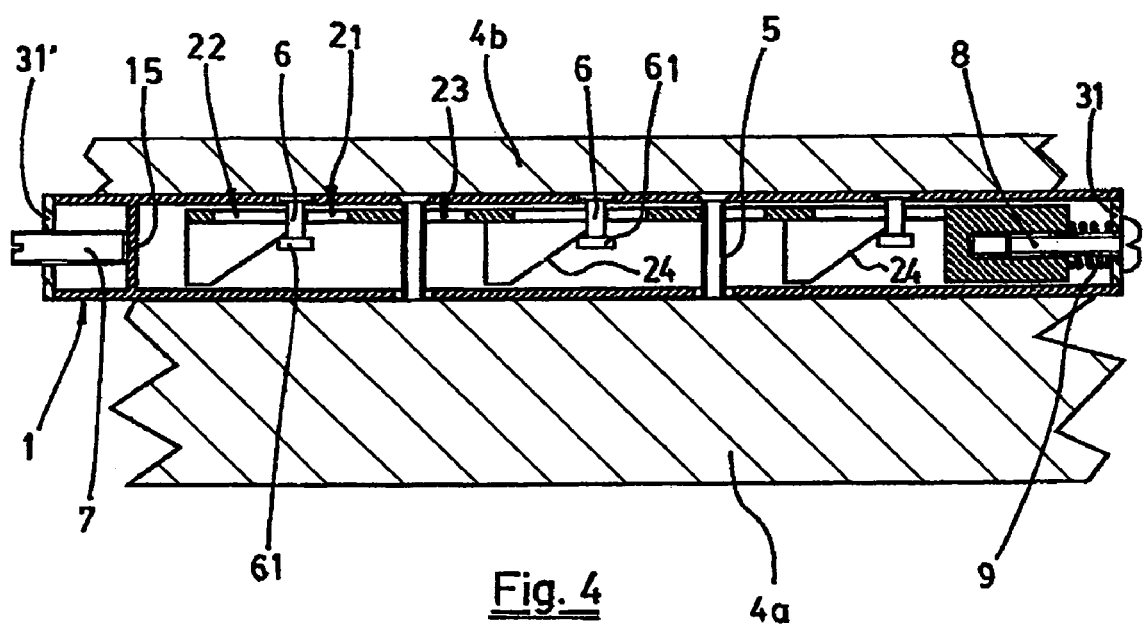
FIG. 4 shows a partially sectioned side view of the device in its operating position, assembling two parts of a piece of furniture.

The box (1) is fitted to one of the parts of the furniture (4a) to be assembled using setscrews (5), as can be seen in FIGS. 2 to 4. The other part of the furniture (4b) to be attached has pivots (6) fixed to it.

The "U"-shaped prismatic box (1) has holes (12) in its wings (11) to fit the setscrews (5) and holes (13) to pass the rear ends of the pivots (6) through to the inside. The holes (12 and 13) are facing each other on both wings (11) to make the box (1) reversible.

The handle (2) has holes (21) in it that are prolonged by mounting holes (22) so that the pivots (6) can pass through, oval holes (23) for the setscrews (5) to pass through and lower wedges (24) to act on the heads of the pivots (61).

The lid (3) also has a "U"-shaped prismatic form. Its wings (31) close the ends of the box (1) and its centre (32) closes the lengthways side of the box (1) between the free ends of its wings (11).

The lid (3) is secured to the box (1) using taps (14) located on one end of both wings (11) of the box (1) that are fitted into slots (33) on one wing of the lid (31). Securing is ensured by the end of a setscrew (7) that presses onto the end piece (15) located to close the existing opening between the wings (11) and the centre (16) of the box (1). This setscrew (7) runs through the threaded hole (34) on one wing of the lid (31').

With the box (1) closed using the lid (3), the handle (2) can be moved on the inside without any outside interference, guaranteeing a lengthways slide between an inoperative position and an operative position.

One end of the handle (2) has a threaded hole (25) with a long thread to ensure a slide screw (8) can be secured from the outside through a circular hole (35) made in one wing (31) of the lid (3) to ensure the handle (2) slides lengthways.

A return spring (9) mounted on the slide screw (8) between the end of the handle (2) and the inside of the wing (31) on the lid (3) also ensures the sliding of the handle (2). The return spring (9) forces the handle (2) to slide lengthways in the opposite direction to that of tightening the slide screw (8), the handle (2) always being placed in a inoperative position. The presence of the return spring (9) is essential for dismantling parts of the furniture (4a, 4b).

The upper surface of the handle (2) has projecting wings (26) to finish its sides, as can be seen in FIG. 1. These wings (26) slide along the inside of lengthways windows (36) to guide the handle (2) as it slides along the inside of the box (1).

FIG. 2 shows the situation before assembling the parts of the piece of furniture (4a, 4b). The pivots (6) are appropriately secured to one of the parts of the piece of furniture (4b). The box (1) is suitably mounted with the handle (2), the return spring (9), the lid (3), the setscrew (7) and the slide screw (8).

FIG. 3 shows the situation when the box (1) has been secured to the other part of the piece of furniture (4a) using the setscrews (5) that pass through the holes (12) in front of each other on both wings (11) of the box (1) and the oval holes (23) in the handle (2).

FIG. 3 also shows how, on joining the two parts of the piece of furniture (4a, 4b), the pivots (6) become housed inside the box (1) after inserting them in the holes (13) in the box (1) and the holes (21) in the handle (2).

By tightening the slide screw (8), the handle (2) slides and the lower wedges (24) drive the heads (61) of the pivots to secure and fix the parts of the piece of furniture (4a, 4b), as is seen in FIG. 4.

To separate or dismantle the parts of the furniture (4a, 4b), simply loosen the slide screw (8), as the return spring (9) will move the handle (2) to it initial inoperative position.

Once the nature of the invention has been described and an example given of its preferred implementation, it must be noted that the materials, shape, size and layout of the items described may be modified, provided that this does not alter the essential features of the invention claimed below.

The invention claimed is:

1. Furniture assembly device for assembling two parts of furniture together, said furniture assembly device comprising:
   a U-shaped box including holes in its wings to fit setscrews from the box to one of the two parts of the furniture to be assembled and holes to insert rear ends of pivots to an inside of the box, which are secured to the other part of the two parts of the furniture to be attached,
   a handle fitted inside the box moveable lengthways between an inoperative position and an operative position, the handle including holes to insert heads of the pivots, mounting holes to insert the pivots while the handle slides to the operative position, oval holes to insert setscrews and lower wedges that drive the heads of the pivots as the handle moves to the operative position, bringing the two parts of the furniture, to be assembled together,
   means for moving the handle on the inside of the box,
   a lid to close the box, and additional closing means for securing the lid to the box in a stable manner to ensure the handle slides on the inside of the box without any kind of interference, the additional closing means on the lid consists of slots on one wing of the lid to set tabs on the box in a closed position and a threaded hole on another wing of the lid to insert a setscrew that secures the lid by pressing an end down on an end piece of the box.

2. Device, according to claim 1, wherein all of the holes on the wings of the box are facing each other to make the box reversible.

3. Device, according to claim 1, wherein the lid has a U-shaped form to ensure the box is closed using the wings of the lid and a center of the lid, closing an entire lengthways side of the box between free ends of the wings.

4. Device, according to claim 1, wherein the additional closing means included in the box includes tabs to finish one of the ends of both wings and an end piece to close an existing opening between the wings and a center of the box close to the other end of the wings.

5. Device, according to claim 1, wherein projecting wings finish both sides of an upper surface of the handle to guide a sliding movement along an inside of lengthways windows distributed on one side along a center of the lid and on a center of the box.

6. Device, according to the previous claim 1, wherein the box, with the handle and the lid, is secured to the one part of the furniture using the setscrews that pass through the holes facing each other on both wings of the box and the oval holes in the handle.

7. Device, according to claim 1, wherein the means to move the handle on the inside of the box include a threaded hole in one end of the handle so that a thread of a slide screw inserted from the outside through a circular hole made in one wing of the lid causes the handle to slide lengthways.

8. Device, according to claim 7, further comprising a return spring mounted on the slide screw between the handle and the wing of the lid to force the handle to slide lengthways in an opposite direction to that of the tightening of the slide screw, placing the handle in the inoperative position.

9. Device, according to claim 8, wherein the threaded hole in the end of the handle includes a long thread to secure the slide screw tightly.

* * * * *